(12) United States Patent
Sato

(10) Patent No.: US 12,729,823 B2
(45) Date of Patent: Sep. 8, 2026

(54) VEHICLE LAMP

(71) Applicant: Stanley Electric Co., Ltd., Tokyo (JP)

(72) Inventor: Koji Sato, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 0 days.

(21) Appl. No.: 19/104,866

(22) PCT Filed: Aug. 4, 2023

(86) PCT No.: PCT/JP2023/028602
§ 371 (c)(1),
(2) Date: Feb. 19, 2025

(87) PCT Pub. No.: WO2024/043045
PCT Pub. Date: Feb. 29, 2024

(65) Prior Publication Data

US 2026/0055867 A1 Feb. 26, 2026

(30) Foreign Application Priority Data

Aug. 24, 2022 (JP) ................................ 2022-133576

(51) Int. Cl.
*F21S 43/247* (2018.01)
*B60Q 1/00* (2006.01)
(Continued)

(52) U.S. Cl.
CPC ........... *F21S 43/237* (2018.01); *F21S 43/245* (2018.01); *F21S 43/247* (2018.01); *F21S 43/253* (2024.05);
(Continued)

(58) Field of Classification Search
CPC .. B60Q 3/62; B60Q 3/64; F21S 43/235; F21S 43/236; F21S 43/237; F21S 43/241;
(Continued)

(56) References Cited

U.S. PATENT DOCUMENTS 4,673,243 A * 6/1987 Yamashita ........... G02B 6/2821 385/45
2016/0121782 A1 * 5/2016 Soenen .................. F21S 41/24 362/511
(Continued)

FOREIGN PATENT DOCUMENTS

JP 2012028156 A * 2/2012
JP 2012-129146 A 7/2012
(Continued)

OTHER PUBLICATIONS

Machine translation of JP 2012028156 A retrieved from the FIT database of PE2E search. (Year: 2025).*
(Continued)

*Primary Examiner* — Colin J Cattanach
(74) *Attorney, Agent, or Firm* — Kenealy Vaidya LLP

(57) ABSTRACT

A light guide body has a first curved portion curved from a diverging portion toward the one side in a first direction, a second curved portion curved from the diverging portion toward the other side in the first direction, and the diverging portion is formed so that a boundary between at least the first curved portion and the second curved portion draws a straight line in a cross section of a second direction which is perpendicular to an axial direction of a first light guide part.

14 Claims, 9 Drawing Sheets

(51) Int. Cl.

| | |
|---|---|
| ***B60Q 3/62*** | (2017.01) |
| ***B60Q 3/64*** | (2017.01) |
| ***F21S 41/24*** | (2018.01) |
| ***F21S 43/235*** | (2018.01) |
| ***F21S 43/236*** | (2018.01) |
| ***F21S 43/237*** | (2018.01) |
| ***F21S 43/241*** | (2018.01) |
| ***F21S 43/242*** | (2018.01) |
| ***F21S 43/243*** | (2018.01) |
| ***F21S 43/245*** | (2018.01) |
| ***F21S 43/249*** | (2018.01) |
| ***F21S 43/251*** | (2018.01) |
| ***F21V 8/00*** | (2006.01) |
| ***F21W 103/10*** | (2018.01) |
| ***F21W 103/20*** | (2018.01) |
| ***F21W 103/35*** | (2018.01) |
| ***F21W 103/45*** | (2018.01) |
| ***F21W 103/55*** | (2018.01) |
| *B60Q 3/66* | (2017.01) |

(52) U.S. Cl.

CPC .............. *B60Q 1/0011* (2013.01); *B60Q 3/62* (2017.02); *B60Q 3/64* (2017.02); *B60Q 3/66* (2017.02); *F21S 41/24* (2018.01); *F21S 43/235* (2018.01); *F21S 43/236* (2018.01); *F21S 43/241* (2018.01); *F21S 43/243* (2018.01); *F21S 43/246* (2024.05); *F21S 43/2492* (2024.05); *F21S 43/251* (2018.01); *F21W 2103/10* (2018.01); *F21W 2103/20* (2018.01); *F21W 2103/35* (2018.01); *F21W 2103/45* (2018.01); *F21W 2103/55* (2018.01); *G02B 6/0005* (2013.01); *G02B 6/001* (2013.01)

(58) Field of Classification Search

CPC ...... F21S 43/243; F21S 43/245; F21S 43/246; F21S 43/247; F21S 43/2492; F21S 43/251; G02B 6/0005

See application file for complete search history.

(56) References Cited

U.S. PATENT DOCUMENTS

| | | | | |
|---|---|---|---|---|
| 2017/0097133 | A1 * | 4/2017 | Lee | F21S 41/24 |
| 2019/0283663 | A1 | 9/2019 | Ohgitani et al. | |
| 2021/0388971 | A1 | 12/2021 | Motoi | |

FOREIGN PATENT DOCUMENTS

| | | | | | |
|---|---|---|---|---|---|
| JP | 2015-065071 | A | | 4/2015 | |
| JP | 2017147120 | A | * | 8/2017 | F21S 43/14 |
| JP | 2019050130 | A | * | 3/2019 | |
| JP | 2019-160749 | A | | 9/2019 | |
| JP | 2021-182488 | A | | 11/2021 | |
| WO | WO-2019166095 | A1 | * | 9/2019 | F21S 43/19 |
| WO | 2020/195609 | A1 | | 10/2020 | |

OTHER PUBLICATIONS

Machine translation of JP 2019050130 A retrieved from the FIT database of PE2E search. (Year: 2025).*

Machine translation of JP 2017147120 A retrieved from the FIT database of PE2E search. (Year: 2025).*

International Serch Report for PCT/JP2023/028602 mailed on Sep. 26, 2023.

* cited by examiner 1
2
3
4
5
6
7
10
11
12
13
14
IV
IV
X
Y
Z

VEHICLE LAMP

This application is a U.S. National Stage Application under 35 U.S.C § 371 of International Patent Application No. PCT/JP2023/028602 filed Aug. 4, 2023, which claims the benefit of priority under 35 U.S.C. § 119 to Japanese Patent Application No. 2022-133576 filed Aug. 24, 2022, the disclosures of all of which are hereby incorporated by reference in their entireties.

TECHNICAL FIELD

The present invention relates to a vehicle lamp.

BACKGROUND ART

In the related art, as a vehicle lamp installed in a vehicle, a configuration of a combination of a light source such as a light emitting diode (LED) and a rod-shaped or plate-shaped light guide body is known.

In such a vehicle lamp, light emitted from the light source enters the base end side of the light guide body, and is guided toward the tip side of the light guide body while repeatedly reflecting the light inside the light guide body. In addition, the light reflected by a plurality of reflection cuts provided on the back surface side of the light guide body is emitted from the front surface side of the light guide body. Accordingly, a light emitting section provided on a front surface side of the light guide body can emit light in a line shape or a surface shape.

In addition, some vehicle lamps have a configuration in which light is diverged through a diverging portion provided in a light guide body, and then, a light emitting section provided between one side and the other side of the light guide body that sandwich the diverging portion emits light (for example, see the following Patent Document 1).

CITATION LIST

Patent Document

Patent Document 1: Japanese Unexamined Patent Application, First Publication No. 2015-65071

SUMMARY OF INVENTION

Technical Problem

Incidentally, when the above-mentioned diverging portion is provided, some of the light guided inside the diverging portion is not directed toward the tip side of the light guide body, and may leak out from the diverging portion as stray light. In this case, since the capture quantity of the light directed from the diverging portion to the tip side of the light guide body is reduced, utilization efficiency of the light guided inside the light guide body becomes poor.

In particular, when an optical axis of the light emitted from the light source is disposed to be shifted with respect to a boundary of the diverging portion, since there is a difference in the quantity of light diverged at the diverging portion, the reduction in the captured quantity of light mentioned above makes it more difficult to divide the light quantity.

An aspect of the present invention is directed to providing a vehicle lamp capable of increasing capture efficiency of light in a diverging portion and reducing an amount of light leaking out from the diverging portion to the outside.

Solution to Problem

An aspect of the present invention provides the following configurations, (1) A vehicle lamp including:

a light source; and a light guide body configured to guide light emitted from the light source, wherein the light guide body has:

a first light guide part disposed in front of the light source;

an incidence section that is located on a base end side of the first light guide part and that is configured to cause the light emitted from the light source to enter the first light guide part;

a diverging portion located on a tip side of the first light guide part;

a second light guide part extending from the diverging portion toward one side in a first direction;

a third light guide part extending from the diverging portion toward other side in the first direction;

a first curved portion that is a portion of the second light guide part curved from the diverging portion toward the one side in the first direction; and a second curved portion that is a portion of the third light guide part curved from the diverging portion toward the other side in the first direction, and the diverging portion is formed so that at least a part of a boundary between the first curved portion and the second curved portion describes a straight line in a cross section of a second direction which is perpendicular to an axial direction of the first light guide part.

(2) vehicle lamp according to the above-mentioned (1), wherein the cross section of the diverging portion in the second direction is formed so as to describe an ellipse in which two circles of the first curved portion and the second curved portion contact with each other and are connected with two parallel tangential lines.

(3) The vehicle lamp according to the above-mentioned (1), wherein the first curved portion and the second curved portion are formed so as to gradually change from the straight line to an arc from the boundary toward each of tip sides of the first curved portion and the second curved portion in cross sections of a third direction perpendicular to axial directions of the first curved portion and the second curved portion.

(4) The vehicle lamp according to claim 1, wherein the light guide body has:

a first reflecting section that is located on a back surface side of the second light guide part and that is configured to reflect the light guided in the second light guide part toward a front surface side of the second light guide part;

a first emitting section that is located on the front surface side of the second light guide part and that is configured to emit the light reflected by the first reflecting section to an outside of the second light guide part;

a second reflecting section that is located on a back surface side of the third light guide part and that is configured to reflect the light guided in the third light guide part toward a front surface side of the third light guide part; and a second emitting section that is located on the front surface side of the third light guide part and that is configured to emit the light reflected by the second reflecting section to an outside of the third light guide part.

Advantageous Effects of Invention

As described above, according to the aspect of the present invention, it is possible to provide a vehicle lamp capable of increasing capture efficiency of light in a diverging portion and reducing light leaked out from the diverging portion to the outside by preventing occurrence of brightness unevenness.

DESCRIPTION OF EMBODIMENTS

Figure 1:
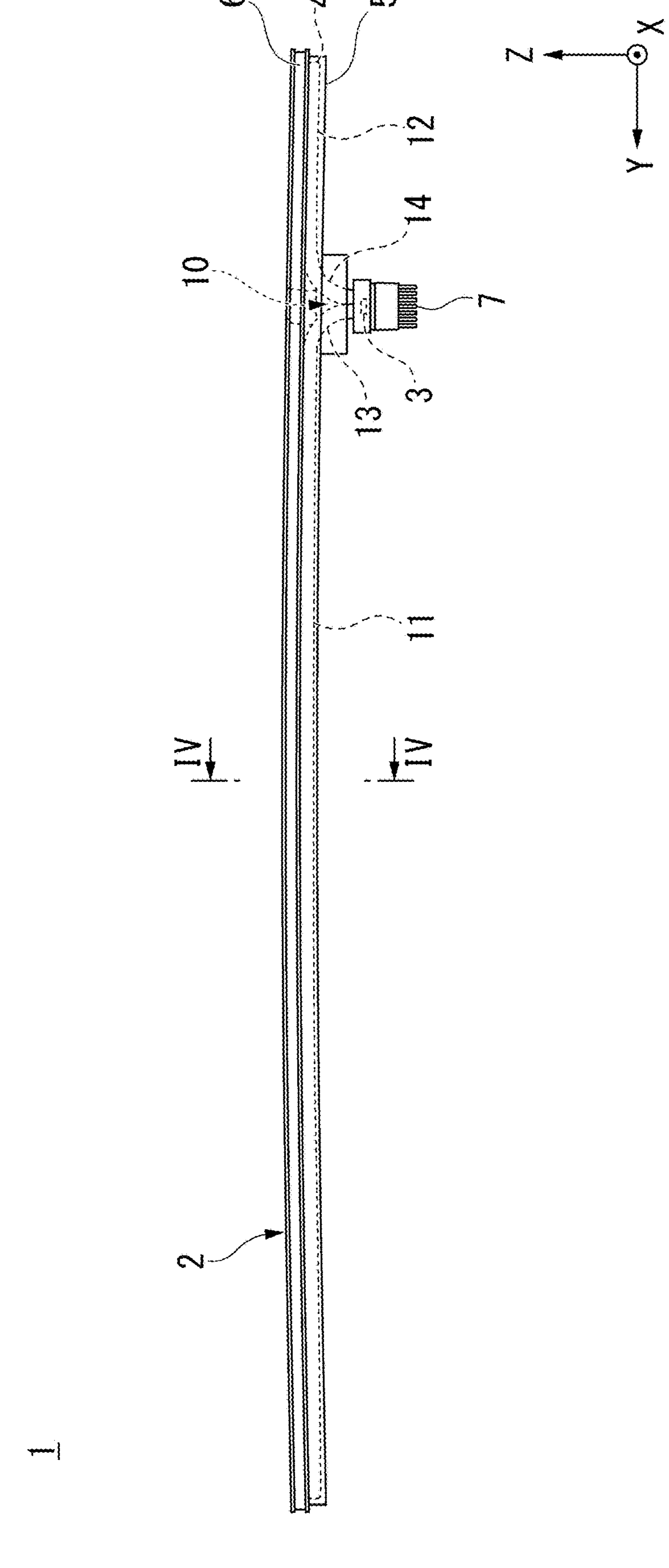
FIG. 1 A front view showing a configuration of a vehicle lamp according to an embodiment of the present invention.

Hereinafter, an embodiment of the present invention will be described with reference to the accompanying drawings.

Further, in the drawings used in the following description, in order to make each component easier to see, dimensions of each component may be shown at different scales, and dimensional ratios of each component may not necessarily be the same as in reality.

As an embodiment of the present invention, for example, a vehicle lamp 1 shown in FIG. 1 to FIG. 11 will be described.

Figure 2:
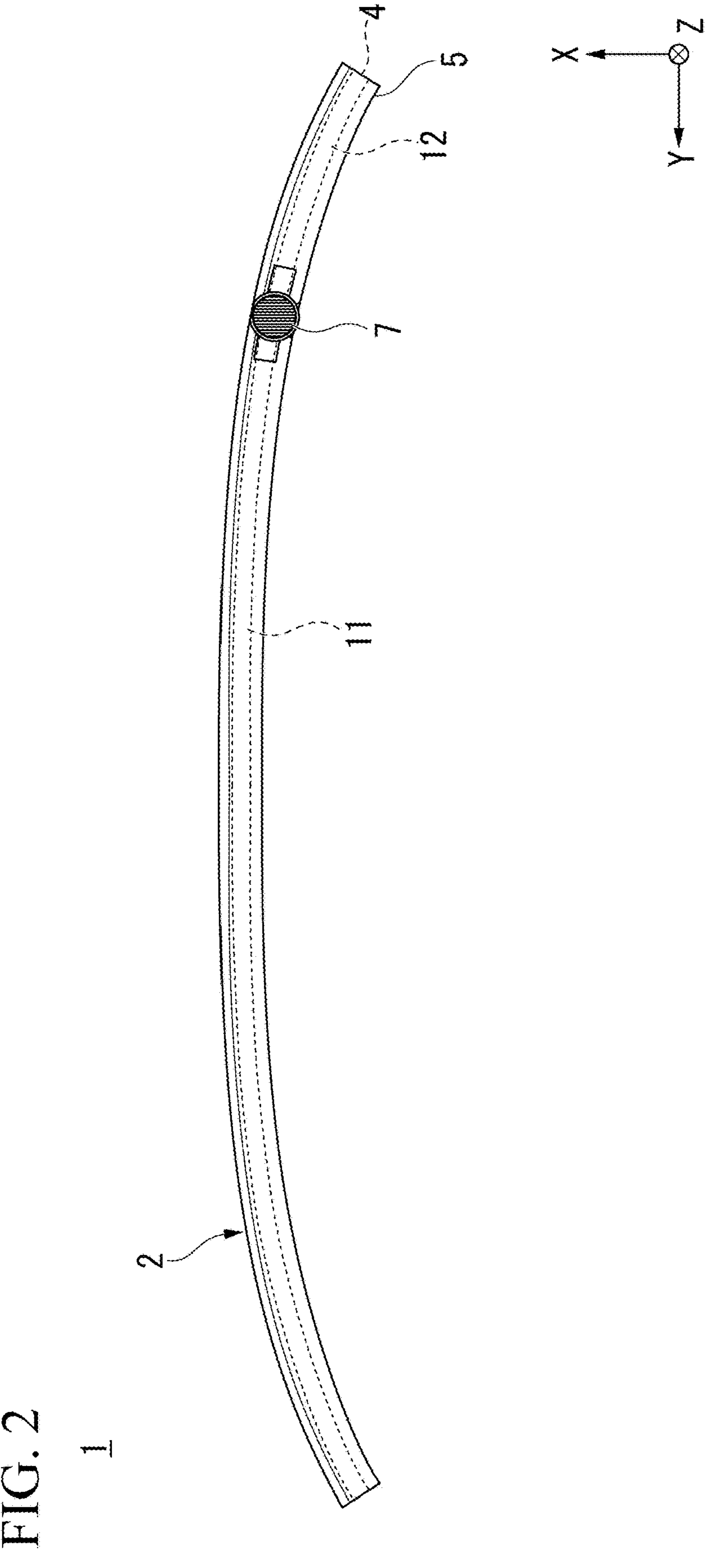
FIG. 2 A bottom view showing the configuration of the vehicle lamp shown in FIG. 1.
Figure 3:
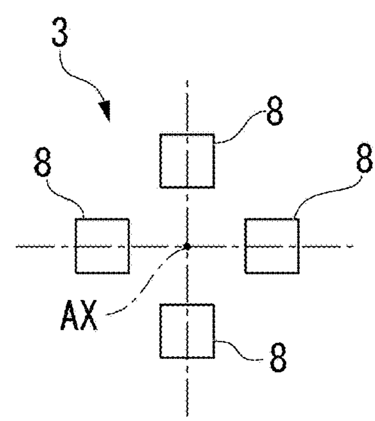
FIG. 3 A plan view of a light source included in the vehicle lamp shown in FIG. 1.
Figure 3:
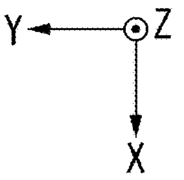
Figure 4:
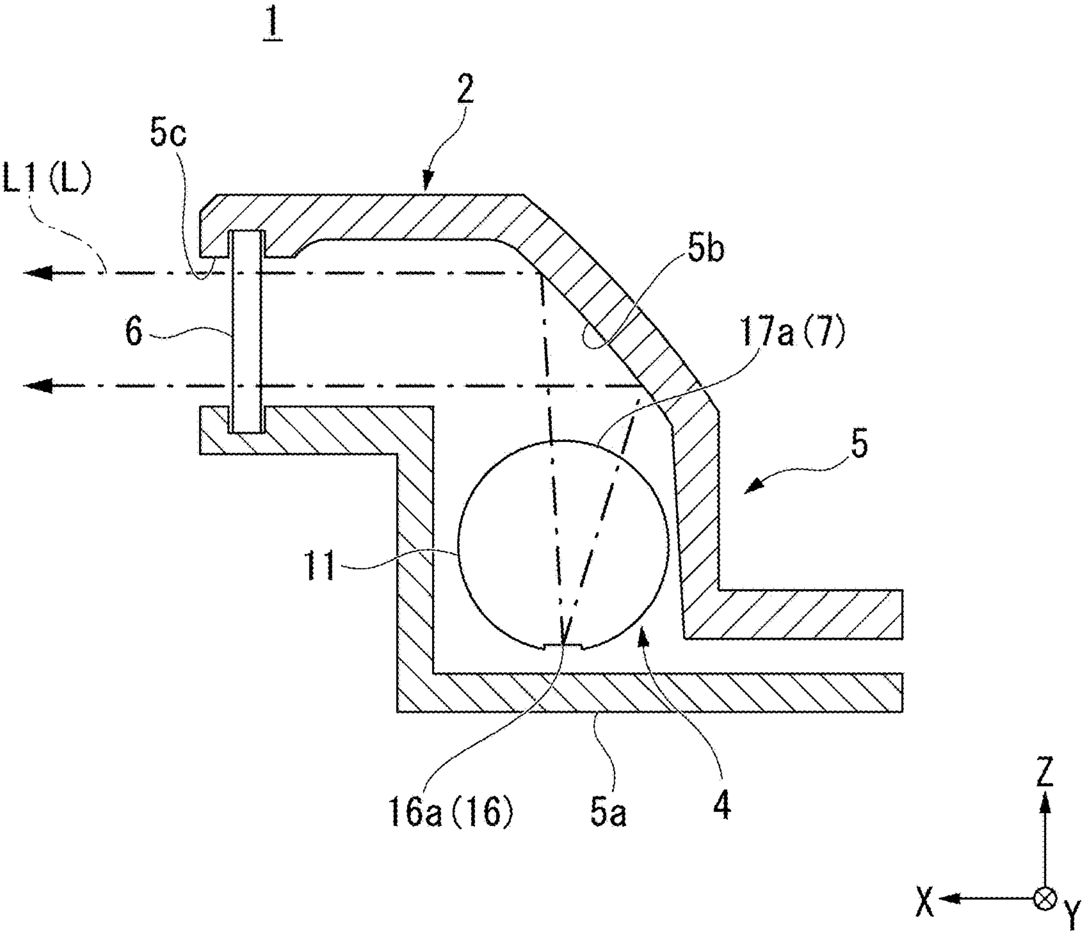
FIG. 4 A cross-sectional view of the vehicle lamp along line segment IV-IV shown in FIG. 1.
Figure 5:
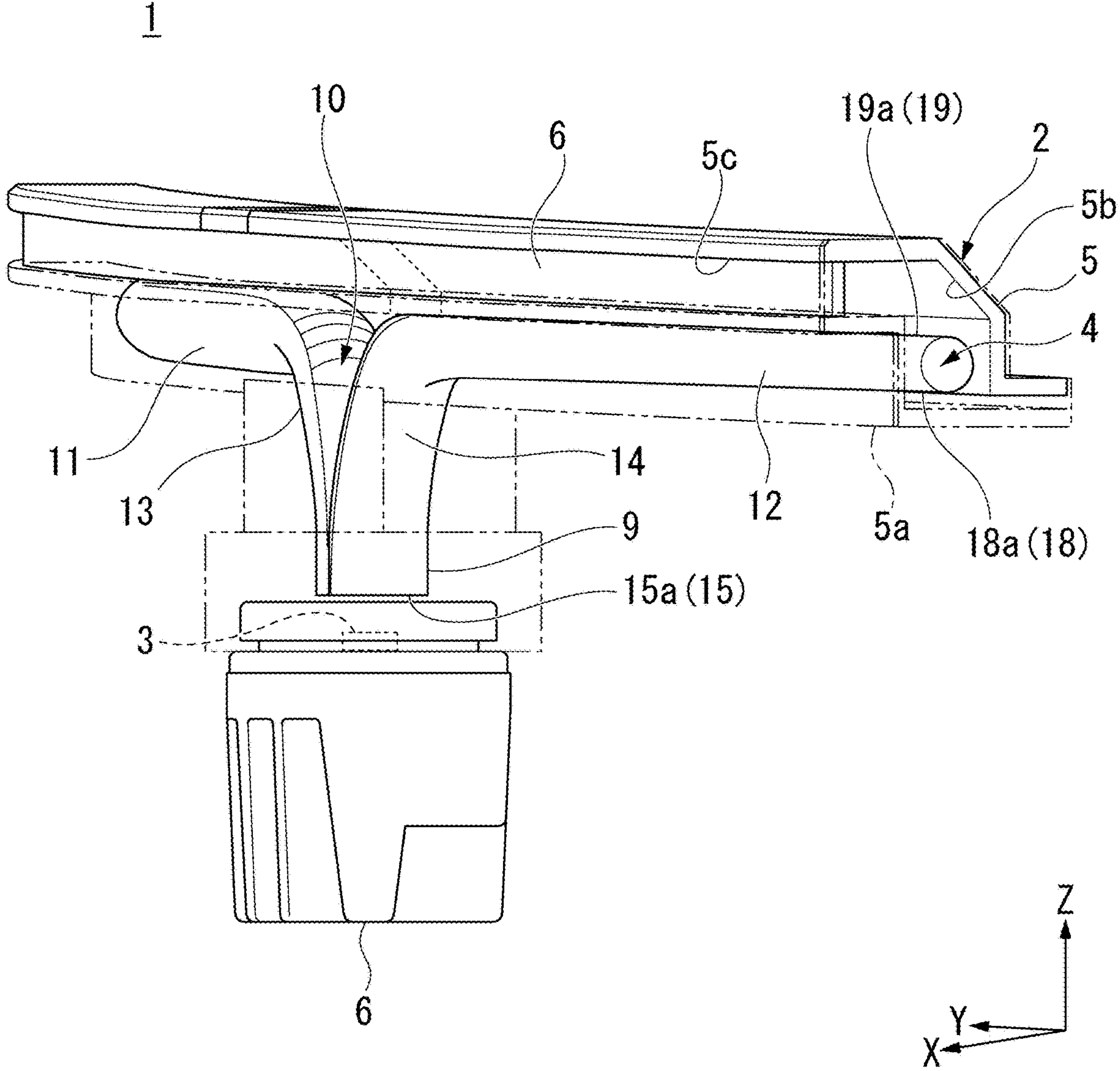
FIG. 5 A perspective view showing the configuration of the vehicle lamp shown in FIG. 1.
Figure 6:
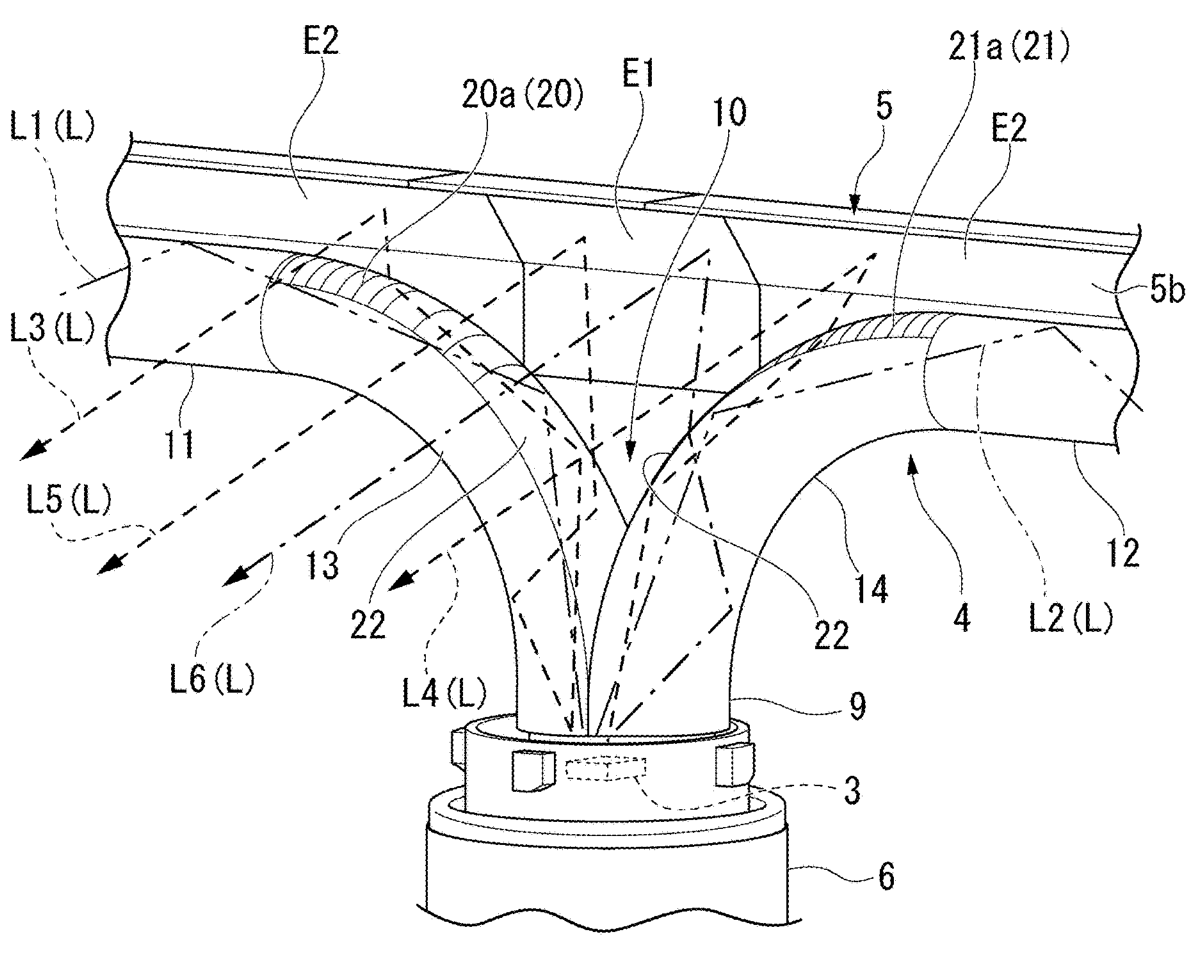
FIG. 6 A perspective view showing a configuration of a coupler socket, an inner lens and a reflecting member shown in FIG. 5.
Figure 6:
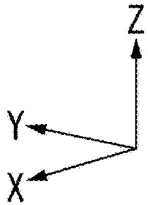
Figure 7:
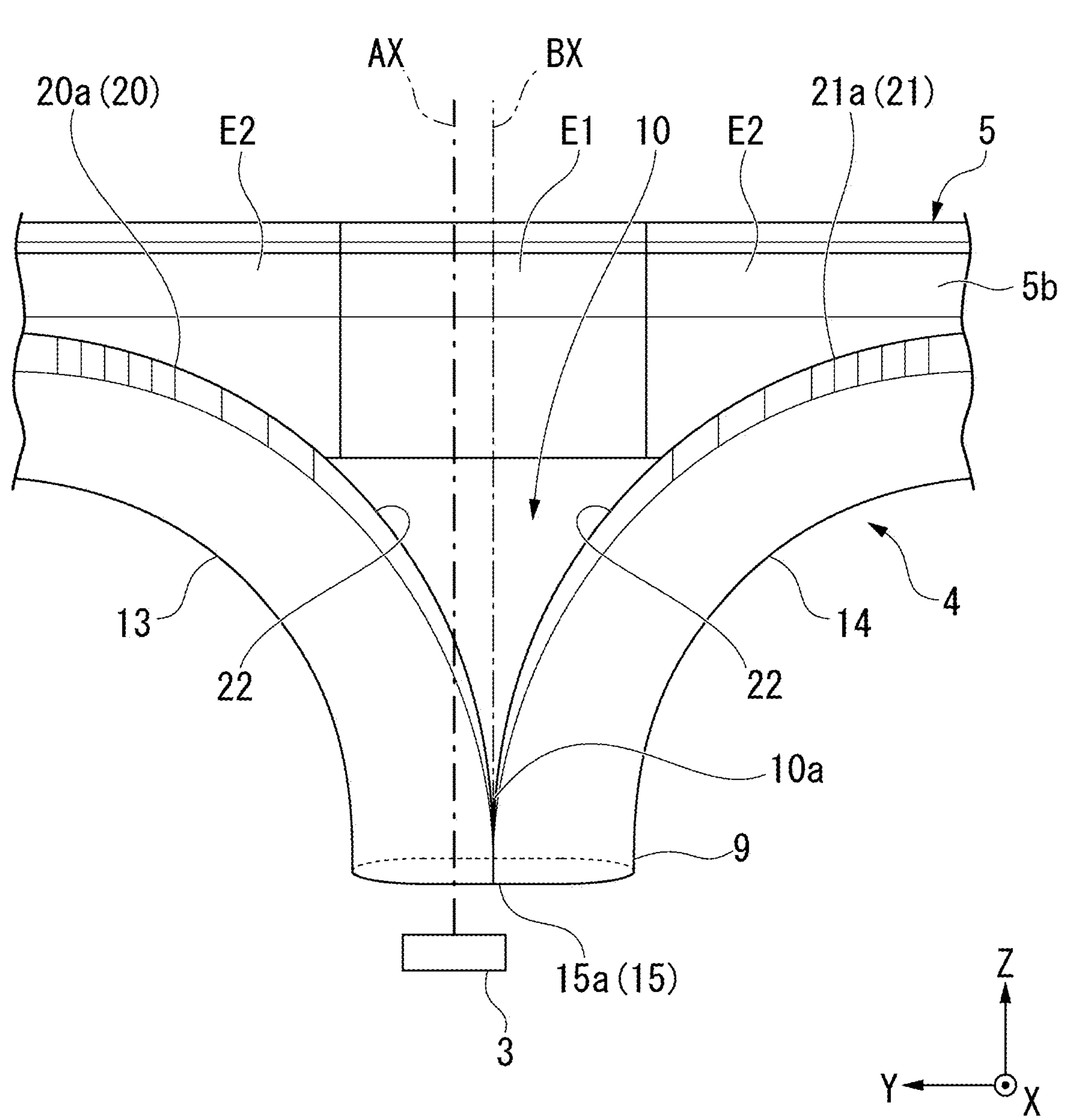
FIG. 7 A front view showing the configuration of the light source, the inner lens and the reflecting member.
Figure 8:
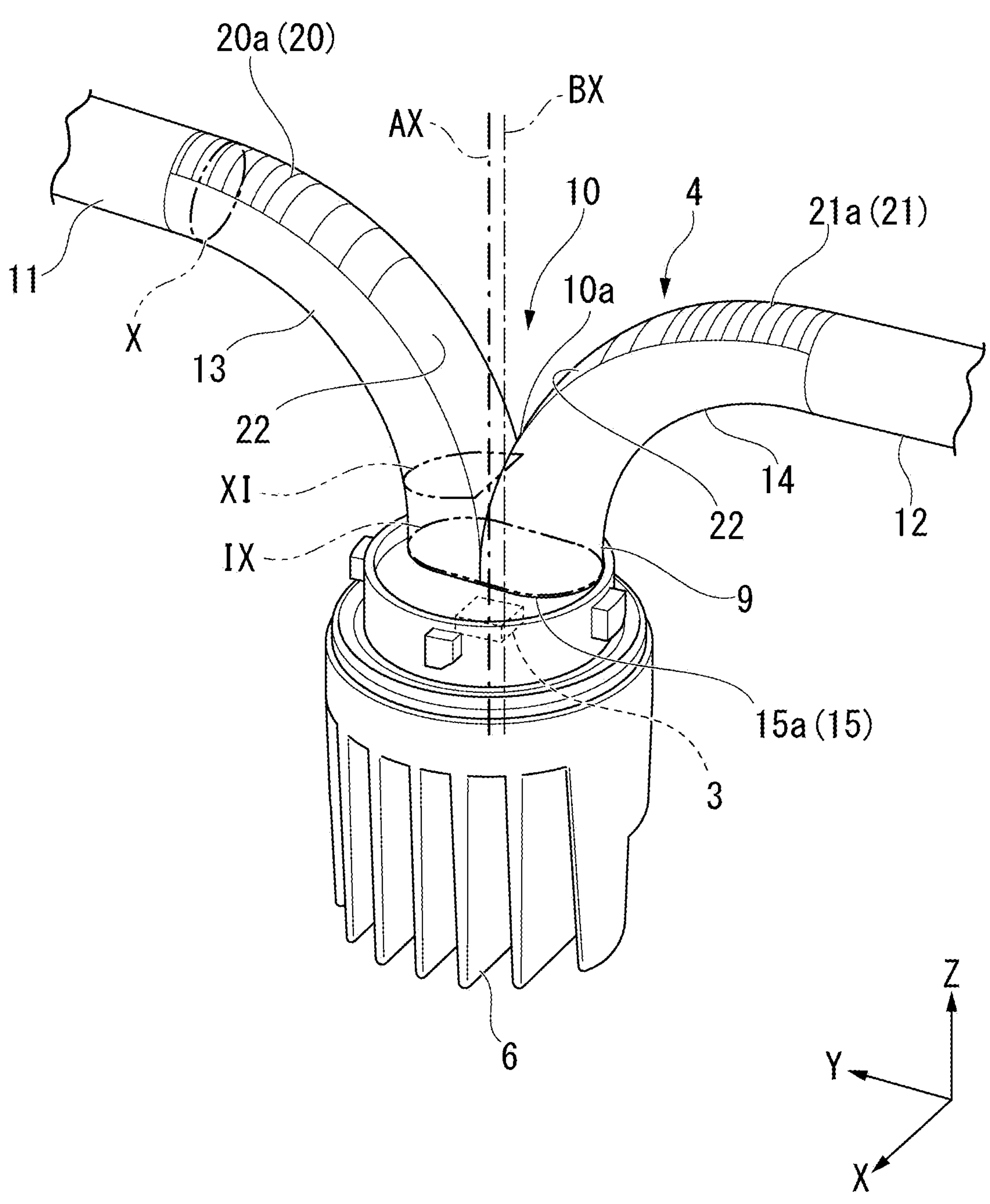
FIG. 8 A perspective view showing the configuration of the coupler socket and the inner lens shown in FIG. 5.
Figure 9:
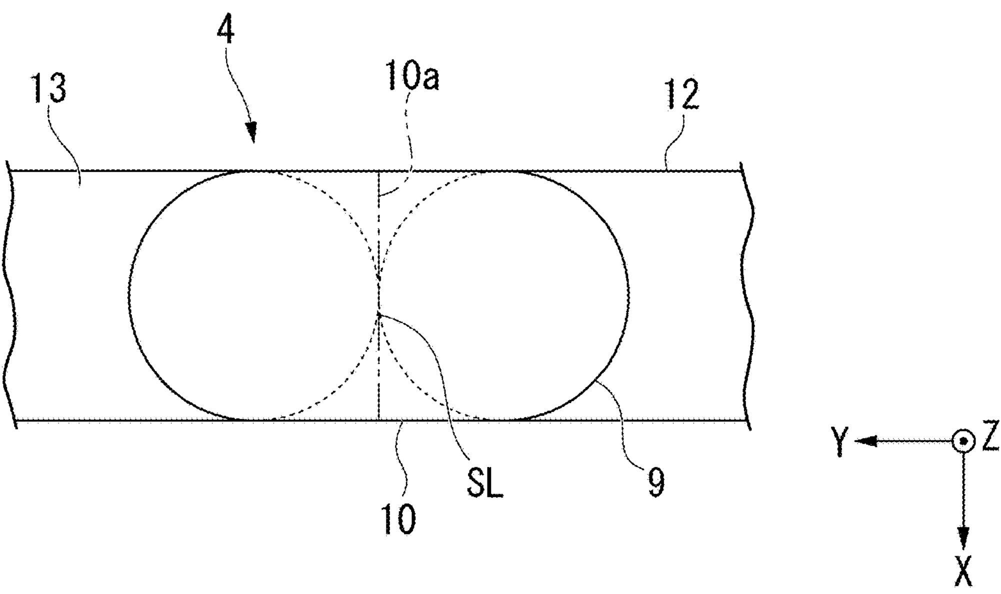
FIG. 9 A cross-sectional view of the inner lens along a cross section IX shown in FIG. 8.
Figure 10:
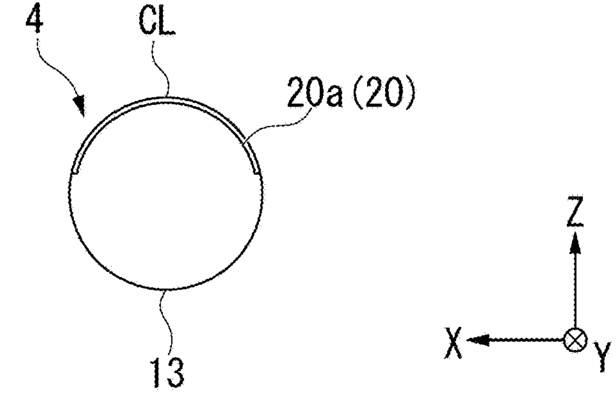
FIG. 10 A cross-sectional view of the inner lens along a cross section X shown in FIG. 8.
Figure 11:
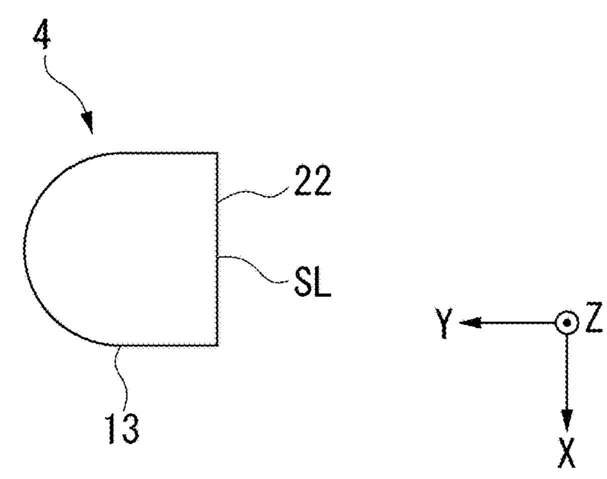
FIG. 11 A cross-sectional view of the inner lens along a cross section XI shown in FIG. 8.

Further, FIG. 1 is a front view showing a configuration of the vehicle lamp 1. FIG. 2 is a bottom view showing the configuration of the vehicle lamp 1. FIG. 3 is a plan view of a light source 3 included in the vehicle lamp 1. FIG. 4 is a cross-sectional view of the vehicle lamp 1 along line segment IV-IV shown in FIG. 1. FIG. 5 is a perspective view showing the configuration of the vehicle lamp 1. FIG. 6 is a perspective view showing a configuration of a coupler socket 7, an inner lens 4 and a reflecting member 5. FIG. 7 is a front view showing the configuration of the light source 3, the inner lens 4 and the reflecting member 5. FIG. 8 is a perspective view showing the configuration of the coupler socket 7 and the inner lens 4. FIG. 9 is a cross-sectional view of the inner lens 4 along a cross section IX shown in FIG. 8. FIG. 10 is a cross-sectional view of the inner lens 4 along a cross section X shown in FIG. 8. FIG. 11 is a cross-sectional view of the inner lens 4 along a cross section XI shown in FIG. 8.

In addition, in the drawings as described below, an XYZ orthogonal coordinate system is set, an X-axis direction indicates a forward/rearward direction (lengthwise direction) of the vehicle lamp 1, a Y-axis direction indicates a leftward/rightward direction (widthwise direction) of the vehicle lamp 1, and a Z-axis direction indicates an upward/downward direction (height direction) of the vehicle lamp 1.

The vehicle lamp 1 of the embodiment is, for example, an application of the present invention to a lid lamp mounted on a back gate or a trunk lid on a rear side of the vehicle.

Further, in the following description, description of directions of "forward," "rearward," "leftward," "rightward," "upward" and "downward" means directions when the vehicle lamp 1 is seen from a front surface (a side behind the vehicle) unless the context indicates otherwise. Accordingly, directions when the vehicle is seen from a front surface (a side in front of the vehicle) are directions in which the directions of forward, rearward, leftward and rightward are reversed.

As shown in FIG. 1 and FIG. 2, the vehicle lamp 1 of the embodiment has a configuration in which the light source 3, the inner lens 4, and the reflecting member 5 are disposed inside a lighting body 2.

The lighting body 2 has the reflecting member 5 that constitutes a housing 5*a* with a front surface that is open, and a transparent outer lens (cover lens) 6 configured to cover the opening of the housing, and has a long shape extending in a widthwise direction of the vehicle (hereinafter, referred to as "a vehicle width direction") as a whole.

In addition, the lighting body 2 has a curved shape from a center portion in the vehicle width direction toward both end portions in accordance with a slant shape given to both corner portions on the rear end side of the vehicle. Further, a shape of the lighting body 2 is not limited to this curved shape and can be changed as appropriate in accordance with the design of the vehicle, or the like.

The vehicle lamp 1 of the embodiment includes the coupler socket 7 in which the light source 3 is disposed. The coupler socket 7 is detachably attached to surroundings of an attachment hole (not shown) provided in a lower portion of the reflecting member 5 that constitutes the housing while being inserted into the lighting body 2 from the attachment hole.

The light source 3 has at least one or a plurality of (in the embodiment, four) light emitting elements 8 configured to emit red light (hereinafter, referred to as "light") L. The light emitting elements 8 are constituted by, for example, LEDs, mounted on a surface of a circuit board (not shown) on which a driving circuit that drives the LEDs is provided, and emit the light radially forward (upward in this embodiment). In addition, the plurality of light emitting elements 8 are provided on the same one surface of the circuit board and radially emit the light L in the same direction.

In the light source 3 of the embodiment, as shown in FIG. 3, the four light emitting elements 8 are disposed in a quadrilateral arrangement with their centers coinciding with a center axis AX of the coupler socket 7. Accordingly, when the plurality of light emitting elements 8 are regarded as a single light source 3, the optical axis of the light source 3 shall be treated as coinciding with the center axis AX of the coupler socket 7 (hereinafter referred to as the optical axis AX of the light source 3).

Further, in the embodiment, the above mentioned configuration includes the coupler socket 7 in which the light source 3 is disposed, but this is not necessarily limited to such a configuration, and the circuit board in which the light source 3 is disposed may be disposed inside the lighting body 2.

As shown in FIG. 1, FIG. 2 and FIG. 4 to FIG. 11, for example, the inner lens 4 is constituted by a light guide body made of a transparent resin such as polycarbonate or acryl, or glass, and is disposed in front of the light source 3 (the coupler socket 7).

The inner lens 4 has a long round rod shape that extends asymmetrically in the vehicle width direction with respect to the light source 3 (the coupler socket 7) while matching with the shape of the lighting body 2. That is, the light source 3 (the coupler socket 7) is disposed in the inner lens 4 at a position shifted from the center portion of the inner lens 4 in the vehicle width direction, and one side of the inner lens 4 is longer than the other side with respect to the light source 3 (the coupler socket 7).

The inner lens 4 has a first light guide part 9 disposed in front of the light source 3 and extending in the upward/downward direction of the vehicle, a diverging portion 10 located on a tip (in the embodiment, an upper end) side of the first light guide part 9, a second light guide part 11 extending from the diverging portion 10 toward one side (in the embodiment, leftward) in the vehicle width direction, a third light guide part 12 extending from the diverging portion 10 toward the other side (in the embodiment, rightward) in the vehicle width direction, a first curved portion 13 that is a portion of the second light guide part 11 curved from the diverging portion 10 toward one side (in the embodiment, leftward) in the vehicle width direction, and a second curved portion 14 that is a portion of the third light guide part 12 curved from the diverging portion 10 toward the other side (in the embodiment, rightward) in the vehicle width direction.

In addition, the inner lens 4 has an incidence section 15 located on a base end (in the embodiment, a lower end) side of the first light guide part 9, a first reflecting section 16 located on one surface (in the embodiment, a lower surface) side of the second light guide part 11, a first emitting section 17 located on the other surface (in the embodiment, an upper surface) side of the second light guide part 11, a second reflecting section 18 located on one surface (in the embodiment, a lower surface) side of the third light guide part 12, a second emitting section 19 located on the other surface (in the embodiment, an upper surface) side of the third light guide part 12, a first light guide emitting section 20 located in the first curved portion 13, and a second light guide emitting section 21 located in the second curved portion 14.

The incidence section 15 is located on a base end (lower end) side of the first light guide part 9, and has a flat (planar) incidence surface 15*a* facing the light source 3. The incidence section 15 causes the light L emitted from the light source 3 to enter the first light guide part 9 (the inner lens 4) from an incidence surface 15*a*. In addition, the light L entering from the incidence section 15 is guided toward the diverging portion 10 that is on the tip (upper surface) of the first light guide part 9 through the first light guide part 9.

Further, the incidence section 15 is not limited to the configuration having the flat (planar) incidence surface 15*a* described above, but may be configured to have a lens shape that collimates or focuses the light L radially emitted from the light source 3 and causes the light L to enter the inside of the first light guide part 9.

The diverging portion 10 is located on the tip (upper end) side of the first light guide part 9, and is a portion where the first curved portion 13 of the second light guide part 11 and the second curved portion 14 of the third light guide part 12 diverge while curving in opposite directions with each other, and guides the light L guided toward the tip (upper surface) side of the first light guide part 9 while diverging the light to the side of the second light guide part 11 and the side of the third light guide part 12.

In addition, among the light L guided from the incidence section 15 toward the diverging portion 10, light L1 diverged from the diverging portion 10 toward the second light guide part 11 is guided from a base end side toward a tip side of the second light guide part 11 via the first curved portion 13. Meanwhile, among the light L guided from the incidence section 15 toward the diverging portion 10, light L2 diverged from the diverging portion 10 toward the third light guide part 12 is guided from a base end side toward a tip side of the third light guide part 12.

Incidentally, in the inner lens 4, lengths of the second light guide part 11 and the third light guide part 12 are different from each other, and the second light guide part 11 extending toward one side (in the embodiment, leftward) in a first direction (in the embodiment, leftward/rightward direction) is longer than the third light guide part 12 extending toward the other side (in the embodiment, rightward) in the first direction.

On the other hand, in the diverging portion 10, a ratio of the light L1 guided toward the second light guide part 11 and a ratio of the light L2 guided toward the third light guide part 12 are adjusted according to differences in lengths (optical path lengths) of the second light guide part 11 and the third light guide part 12.

Specifically, in the diverging portion 10, since the second light guide part 11 is longer than the third light guide part 12, the optical axis AX of the light L emitted from the light source 3 is disposed to be shifted toward the second light guide part 11 with respect to a boundary line BX passing through a boundary 10*a* between the second light guide part 11 and the third light guide part 12.

Accordingly, among the light L guided toward the diverging portion 10, the ratio of the light L1 diverged and guided toward the second light guide part 11 is adjusted to be greater than the ratio of the light L2 diverged and guided toward the third light guide part 12.

The first reflecting section 16 is located on one surface (lower surface) side of the second light guide part 11 and has a plurality of reflection cuts 16*a* arranged in a direction in which the second light guide part 11 extends (leftward/rightward direction). As long as the plurality of reflection cuts 16*a* reflects the light L1 entering one surface (lower surface) side of the second light guide part 11 at an angle such that the light L1 is emitted (transmitted) from the other surface (upper surface) side of the second light guide part 11 to the outside, and there are no particular limitations on their shapes, sizes, numbers, or the like. In the embodiment, the plurality of reflection cuts 16*a* are groove portions having a substantially triangular cross section formed by cutting out one surface (lower surface) side of the second light guide part 11 in the forward/rearward direction and the plurality of reflection cuts 16*a* are arranged side by side in the leftward/rightward direction.

In addition, in order for the plurality of reflection cuts 16*a* to uniformly distribute the light L1 emitted from the first emitting section 17 in the direction in which the second light guide part 11 extends (leftward/rightward direction), the depth of the groove portions forming the reflection cuts 16*a* gradually increases from the base end side towards the tip side of the second light guide part 11. Alternatively, the intervals between adjacent ones of the plurality of reflection cuts 16*a* may become gradually shortened from the base end side towards the tip side of the second light guide part 11.

The first emitting section 17 is located on the other surface (upper surface) side of the second light guide part 11 and has a first emitting surface 17*a* continuous in the direction in which the second light guide part 11 extends (leftward/rightward direction). The first emitting surface 17*a* is constituted by a convex surface curved in an arc shape in a cross section (vertical cross section) in a direction perpendicular to an extension direction of the second light guide part 11.

In the first emitting section 17, the light L1 reflected by the plurality of reflection cuts 16*a* (the first reflecting section 16) is emitted to the outside of the second light guide part 11 from the first emitting surface 17*a*.

The second reflecting section 18 is located on one surface (lower surface) side of the third light guide part 12, and has a plurality of reflection cuts 18*a* arranged in a direction in which the third light guide part 12 extends (leftward/rightward direction). The plurality of reflection cuts 18*a* need only reflect the light L2 entering one surface (lower surface) side of the third light guide part 12 at an angle such that the light L2 is emitted (transmitted) from the other surface (upper surface) of the third light guide part 12 to the outside, and there are no particular limitations on their shapes, sizes, numbers, or the like. In the embodiment, the plurality of reflection cuts 18*a* are groove portions having a substantially triangular cross section formed by cutting out one surface (lower surface) side of the third light guide part 12 in the forward/rearward direction and arranged side by side in the leftward/rightward direction.

In addition, in order for the plurality of reflection cuts 18*a* to uniformly distribute the light L2 emitted from the second emitting section 19 in the direction in which the third light guide part 12 extends (leftward/rightward direction), the depth of the groove portion forming the reflection cuts 18*a* gradually increases from the base end side toward the tip side of the third light guide part 12. Alternatively, the intervals between adjacent ones of the plurality of reflection cuts 18*a* may become gradually shortened from the base end side towards the tip side of the third light guide part 12.

The second emitting section 19 is located on the other surface (upper surface) side of the third light guide part 12, and has a second emitting surface 19*a* continuous in a direction in which the third light guide part 12 extends (leftward/rightward direction). The second emitting surface 19*a* is constituted by a convex surface curved in an arc shape in a cross section (vertical cross section) in a direction perpendicular to an extension direction of the third light guide part 12.

In the second emitting section 19, the light L2 reflected by the plurality of reflection cuts 18*a* (the second reflecting section 18) is emitted to the outside of the third light guide part 12 from the second emitting surface 19*a*.

As shown in FIG. 7 and FIG. 8, the first light guide emitting section 20 and the second light guide emitting section 21 are provided on both sides of a diverging center portion 22 where the first curved portion 13 and the second curved portion 14 diverge and curve in opposite directions from the boundary 10*a* of the diverging portion 10.

The first light guide emitting section 20 is located on the other surface (upper surface) side of the first curved portion 13, and has a plurality of emission cuts 20*a* arranged in a direction in which the first curved portion 13 extends (leftward/rightward direction). As long as the plurality of emission cuts 20*a* need only emits (transmits) some light L3 of the light L1 entering the other surface (upper surface) side of the first curved portion 13 to the outside from the other surface (upper surface) side of the first curved portion 13, and there are no particular limitations on their shapes, sizes, numbers, or the like. In the embodiment, the plurality of emission cuts 20*a* are groove portions having a generally triangular cross section formed by cutting out the other surface (upper surface) side of the first curved portion 13 in the forward/rearward direction and arranged side by side in the leftward/rightward direction.

In addition, in order for the plurality of emission cuts 20*a* to uniformly distribute the light L3 emitted from the first light guide emitting section 20 in the first direction (leftward/rightward direction) in which the first curved portion 13 extends, the interval between adjacent ones of the plurality of emission cuts 20*a* gradually shortens from the base end side to the tip side of the first curved portion 13.

The second light guide emitting section 21 is located on the other surface (upper surface) side of the second curved portion 14, and has a plurality of emission cuts 21*a* arranged in a direction in which the second curved portion 14 extends (leftward/rightward direction). As long as the plurality of emission cuts 21*a* need only emit (transmit) some light L4 of the light L2 entering the other surface (upper surface) side of the second curved portion 14 to the outside from the other surface (upper surface) side of the second curved portion 14, and there are no particular limitations on their shapes, sizes, numbers, or the like. In the embodiment, the plurality of emission cuts 21*a* are groove portions having a substantially triangular cross section formed by cutting out the other surface (upper surface) side of the second curved portion 14 in the forward/rearward direction and arranged side by side in the leftward/rightward direction.

In addition, in order for the plurality of emission cuts 21*a* to uniformly distribute the light L4 emitted from the second light guide emitting section 21 in the first direction (leftward/rightward direction) in which the second curved portion 14 extends, the intervals between adjacent ones of the plurality of emission cuts 21*a* are gradually shortened from the base end side to the tip side of the second curved portion 14.

As shown in FIG. 8 and FIG. 9, the diverging portion 10 is formed in a cross section (vertical cross section) in the second direction perpendicular to the axial direction of the first light guide part 9, so as to describe an ellipse connecting two mutually tangent circles of the first curved portion 13 and the second curved portion 14 by two parallel tangential lines.

Further, the first light guide part 9 has the same elliptical cross-sectional shape from the incidence section 15 to the diverging portion 10. In addition, the diameters of the two circles mentioned above are the same as the diameters of the second light guide part 11 and the third light guide part 12, which have a circular cross-sectional shape.

In addition, the diverging portion 10 is formed such that at least a part of the boundary 10*a* between the first curved portion 13 and the second curved portion 14 describes a straight line SL in a cross section (vertical cross section) in the second direction. That is, the boundary 10*a* of the diverging portion 10 is formed so as to divide the middle of the two mutually tangent circles of the first curved portion 13 and the second curved portion 14 by the straight line SL.

In the inner lens 4, by giving the boundary 10*a* of the incidence section 15 and the diverging portion 10 this shape, the light L guided from the incidence section 15 toward the diverging portion 10 can be efficiently diverged to the side of the first curved portion 13 and the side of the second curved portion 14, thereby reducing the loss of the lights L1 and L2 guided to the side of the second light guide part 11 and the side of the third light guide part 12, and improving the overall utilization efficiency of the light L.

Further, in the boundary 10*a* of the diverging portion 10, in above mentioned the cross section of the second direction, it is not necessary that both ends of the straight line SL are formed to be connected to two tangential lines; for example, the straight line SL may be shaped so that both ends of the straight line SL diverge to the side of the first curved portion 13 and the side of the second curved portion 14, respectively, and be continuously (curved) connected to the two tangential lines, or the straight line SL may be shaped to divide the middle of two intersecting circles.

In addition, in the boundary 10*a* of the diverging portion 10, in the cross section (horizontal cross section) in the axial direction of the first light guide part 9, although a pointed shape is formed between the first curved portion 13 and the second curved portion 14, when molding the inner lens 4 using a mold, the shape between the first curved portion 13 and the second curved portion 14 may be rounded.

As shown in FIG. 8 and FIG. 11, the first curved portion 13 and the second curved portion 14 are formed so as to gradually change from the straight line SL to an arc CL from the boundary 10*a* toward each of tip sides of the first curved portion 13 and the second curved portion 14 in cross sections (vertical cross sections) of in a third direction perpendicular to the axial directions of the first curved portion 13 and the second curved portion 14.

As shown in FIG. 1, FIG. 2 and FIG. 4 to FIG. 7, the reflecting member 5 is, for example, made of a white resin member having light diffusion properties, and has a structure in which the housing 5*a* and a reflector 5*b* are integrally formed.

The reflecting member 5 has an opening portion 5*c* on the front surface side of the vehicle lamp 1, and the housing 5*a* is disposed so as to surround the inner lens 4 except for the upper side of the inner lens 4. In addition, the reflecting member 5 is disposed such that the reflector 5*b* facing the other surface (upper surface) of the inner lens 4 is inclined toward the opening portion 5*c* on the front side. An outer lens 6 is disposed to cover the opening portion 5*c* of the reflecting member 5.

Accordingly, the reflecting member 5 reflects the lights L1 to L4 emitted outward (upward) from the inner lens 4 using the reflector 5*b*, and emits the lights L1 to L4 toward the opening portion 5*c* on the front side.

In addition, among the reflector 5*b*, the reflecting member 5 has a first reflecting region E1 facing the diverging center portion 22 of the inner lens 4, and a pair of second reflecting regions E2 facing the first light guide emitting section 20 and the second light guide emitting section 21 provided on both sides with respect to the diverging center portion 22.

The first reflecting region E1 is, for example, a region with a larger degree of diffusion of the light L than the second reflecting regions E2, due to the application of texture processing or the like.

In the vehicle lamp 1 having the above-mentioned configuration, the lights L1 to L4 (L) emitted from the front surface side of the outer lens 6 can cause the front surface side of the outer lens 6 to emit red light in a line shape as an emitting surface S of a lid lamp.

Incidentally, in the vehicle lamp 1 of the embodiment, as shown in FIG. 6, in the lights L1 and L2 (L) diverged and guided to the side of the first curved portion 13 and the side of the second curved portion 14 from the diverging portion 10 of the inner lens 4, lights L5 and L6 leaked from the diverging center portion 22 to the outside of the first curved portion 13 and the second curved portion 14 are reflected forward by the first reflecting region E1 of the reflector 5*b*.

The diverging center portion 22 is a region in which the leaking lights L5 and L6 tend to generate point lights. The first reflecting region E1 has a greater degree of diffusion of light than the second reflecting regions E2, so it is possible to suppress the occurrence of the point light by reflecting the lights L5 and L6 leaking out from the diverging center portion 22 with a greater degree of diffusion than the second reflecting regions E2.

Meanwhile, in the vehicle lamp 1 of the embodiment, the lights L3 and L4 emitted from the first light guide emitting section 20 and the second light guide emitting section 21 to the outside of the first curved portion 13 and the second curved portion 14 are reflected forward by the pair of second reflecting regions E2 of the reflector 5*b*.

Since the first light guide emitting section 20 and the second light guide emitting section 21 are regions where dark areas that are darker than other areas are likely to occur, it is possible to suppress the occurrence of the dark areas by emitting the lights L3 and L4 from the first light guide emitting section 20 and the second light guide emitting section 21.

Accordingly, in the vehicle lamp 1 of the embodiment, it is possible to cause the region corresponding to the area between the first curved portion 13 and the second curved portion 14, which diverge from the diverging portion 10 (the first reflecting region E1 and the pair of second reflecting regions E2), to emit light approximately uniformly.

In addition, in the vehicle lamp 1 of the embodiment, as shown in FIG. 8 to FIG. 11, the boundary 10*a* of the diverging portion 10 is formed to describe the straight line SL. In addition, the first curved portion 13 and the second curved portion 14 are formed so as to gradually change from the straight line SL to the arc CL from the boundary 10*a* toward each of tip sides of the first curved portion 13 and the second curved portion 14.

In this case, the reflection angle of the lights L1 and L2 at the portion that becomes the straight line SL has a smaller reflection angle of the lights L1 and L2 than at the portion that becomes the arc CL, making it easier for the lights to be totally reflected, and making it possible to reduce the lights L5 and L6 leaking out from the diverging portion 10.

Accordingly, in the vehicle lamp 1 of the embodiment, it is possible to reduce unnecessary lights L5 and L6 leaking out from the above mentioned diverging portion 10 and to increase the capture efficiency of the lights L1 and L2 (L) diverged and guided from the diverging portion 10 to the side of the first curved portion 13 and the side of the second curved portion 14.

As described above, in the vehicle lamp 1 of the embodiment, by appropriately dividing (distributing) the light L emitted from the above mentioned light source 3 to the side of the second light guide part 11 and the side of the third light guide part 12 with respect to the diverging portion 10, it is possible to cause the emitting surface S, which extends in a line shape in the vehicle width direction, to emit light with more uniform illuminance (brightness).

In addition, in the vehicle lamp 1 of the embodiment, the light L guided from the above mentioned incidence section 15 toward the diverging portion 10 can be efficiently diverged to the side of the first curved portion 13 and the side of the second curved portion 14, and the capture efficiency of the lights L1 and L2 (L) can be increased while suppressing the loss (leakage light) of the lights L1 and L2 guided to the side of the second light guide part 11 and the side of the third light guide part 12.

As described above, in the vehicle lamp 1 of the embodiment, it is possible to improve the utilization efficiency of the light L emitted from the light source 3 while preventing occurrence of brightness unevenness on the emitting surface S and improving the appearance upon emission.

Further, the present invention is not necessarily limited to the above-mentioned embodiment, and various modifications can be made without departing from the scope of the present invention.

Figure 12A:
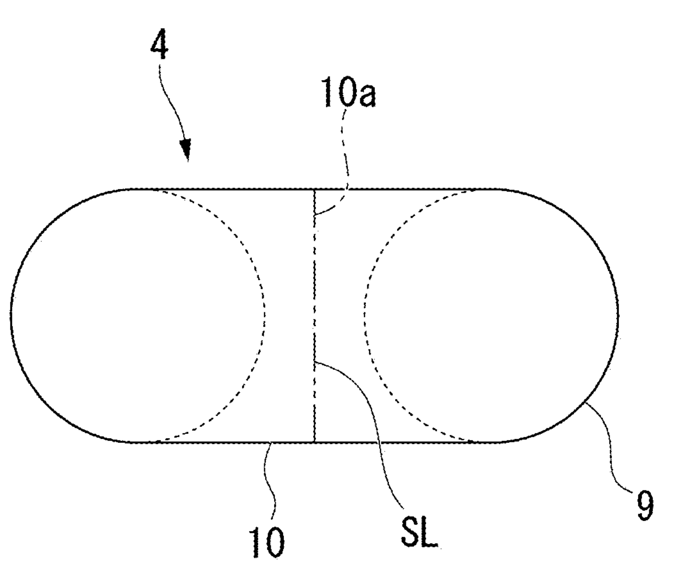
FIG. 12A A cross-sectional view showing a variant of a diverging portion of the inner lens.
Figure 12A:
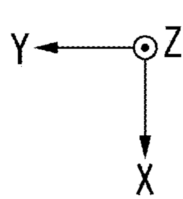
Figure 12B:
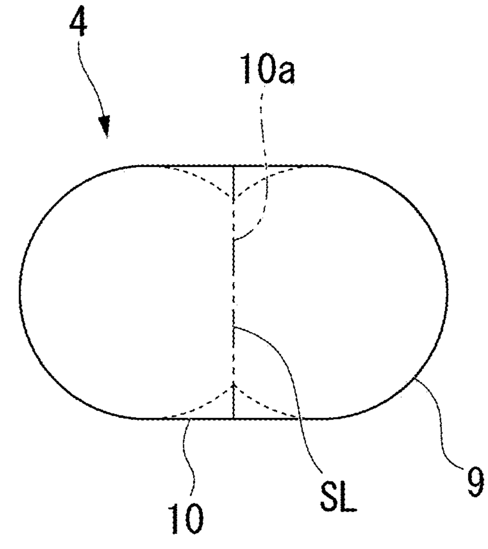
FIG. 12B A cross-sectional view showing a variant of the diverging portion of the inner lens.
Figure 12B:
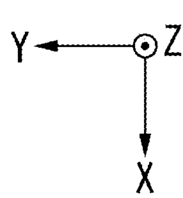

For example, the cross-sectional shape of the diverging portion 10 is not necessarily limited to the shape shown in FIG. 9 described above, but may be an elliptical shape in which two spaced apart circles are connected by two parallel tangential lines as shown in FIG. 12A, or an elliptical shape in which two intersecting circles are connected by two parallel tangential lines as shown in FIG. 12B.

Further, in the embodiment, while the case in which the above mentioned vehicle lamp 1 is applied to the lid lamp has been exemplified, with regard to the vehicle lamp to which the present invention is applied, the present invention can be applied to not only the rear-side vehicle lamps as described above, but also front-side vehicle lamps.

That is, with regard to the vehicle lamps to which the present invention is applied, in addition to the lid lamp described above, the present invention can be widely applied to vehicle lamps such as, for example, tail lamps, stop lamps, back lamps, daytime running lamps (DRLs), sidelights (position lamps), direction indicators (turn lamps), and the like.

In addition, as for the light source, in addition to the above-mentioned LED, light emitting elements such as a laser diode (LD) or the like can be used. In addition, the color of the light emitted from the light source can be changed appropriately depending on the purpose of the vehicle lamp, such as white light, orange, or the like, in addition to the red light as mentioned above.

REFERENCE SIGNS LIST

1 Vehicle lamp
2 Lighting body
3 Light source
4 Inner lens (light guide body)
5 Reflecting member
6 Outer lens
7 Coupler socket
8 Light emitting element
9 First light guide part
10 Diverging portion
11 Second light guide part
12 Third light guide part
13 First curved portion
14 Second curved portion
15 Incidence section
16 First reflecting section
17 First emitting section
18 Second reflecting section
19 Second emitting section
20 First light guide emitting section
21 Second light guide emitting section
22 Diverging center portion
E1 First reflecting region
E2 Second reflecting region
SL Straight line
CL Arc
L, L1 to L6 Light

The invention claimed is:

1. A vehicle lamp comprising:
a light source; and
a light guide body configured to guide light emitted from the light source,
wherein the light guide body has:
a first light guide part disposed in front of the light source;
an incidence section that is located on a base end side of the first light guide part and that is configured to cause the light emitted from the light source to enter the first light guide part;
a diverging portion located on a tip side of the first light guide part;
a second light guide part extending from the diverging portion toward one side in a first direction;
a third light guide part extending from the diverging portion toward other side in the first direction;
a first curved portion that is a portion of the second light guide part curved from the diverging portion toward the one side in the first direction; and
a second curved portion that is a portion of the third light guide part curved from the diverging portion toward the other side in the first direction,
wherein an optical path length of the second light guide part is longer than an optical path length of the third light guide part,
the diverging portion has an oval shape in a cross section of a second direction which is perpendicular to an axial direction of the first light guide part, the oval shape being a shape in which two imaginary mutually tangent partial circles of the first curved portion and the second curved portion are connected with each other in the first direction, and the diverging portion is formed so that at least a part of a boundary between the first curved portion and the second curved portion describes a straight line, which is extending in a short direction of the oval shape, at a center part of the oval shape in a longitudinal direction of the oval shape,
the first light guide part has an oval cross-sectional shape, which has the first direction as a longitudinal direction, from the incidence section to the diverging portion in a cross section in the second direction,
a first light guide emitting section and a second light guide emitting section are provided on both sides of a diverging center portion where the first curved portion and the second curved portion diverge and curve in opposite directions with respect to each other from the boundary, the first light guide emitting section having a plurality of groove portions configured to emit a part of light which has been guided through the first light guide part and which has entered an upper surface of the first curved portion to an outside and the second light guide emitting section having a plurality of groove portions configured to emit a part of light which has been guided through the first light guide part and which has entered an upper surface of the second curved portion to an outside,
the light source is disposed so that an optical axis of the light emitted from the light source is shifted toward the second light guide part with respect to a boundary line passing through the boundary so that a ratio of light (L1) diverged and guided toward the second light guide part is greater than a ratio of light (L2) diverged and guided toward the third light guide part.

2. The vehicle lamp according to claim 1, wherein a cross section of the incidence section in the second direction and the cross section of the diverging portion in the second direction are formed so as to describe ovals in which two imaginary partial circles are connected with two parallel tangential lines.

3. The vehicle lamp according to claim 1, wherein the first curved portion and the second curved portion are formed so as to gradually change from the straight line to an arc from the boundary toward each of tip sides of the first curved portion and the second curved portion in cross sections of a third direction perpendicular to axial directions of the first curved portion and the second curved portion.

4. The vehicle lamp according to claim 1, wherein the light guide body has:

a first reflecting section that is located on a back surface side of the second light guide part and that is configured to reflect the light guided in the second light guide part toward a front surface side of the second light guide part;

a first emitting section that is located on the front surface side of the second light guide part and that is configured to emit the light reflected by the first reflecting section to an outside of the second light guide part;

a second reflecting section that is located on a back surface side of the third light guide part and that is configured to reflect the light guided in the third light guide part toward a front surface side of the third light guide part; and a second emitting section that is located on the front surface side of the third light guide part and that is configured to emit the light reflected by the second reflecting section to an outside of the third light guide part.

5. The vehicle lamp according to claim 1, wherein the light source includes a plurality of light emitting elements that are provided on a same surface of a substrate and that are configured to emit light radially toward a same direction.

6. The vehicle lamp according to claim 5, wherein the light source is disposed in a coupler socket.

7. The vehicle lamp according to claim 1, further comprising a reflecting member that is configured to reflect light emitted from the light guide body, wherein the reflecting member includes a plurality of reflecting regions that face an upper surface of the light guide body and that are configured to reflect the light emitted from the light guide body, the plurality of reflecting regions include a first reflecting region facing the diverging center portion and a pair of second reflecting regions facing the first light guide emitting section and the second light guide emitting section, the first reflecting region is a reflecting surface which has a greater degree of diffusion of light emitted from the light guide body than the second reflecting regions, and the first reflecting region is configured to reflect and diffuse light leaked from the diverging center portion to the outside.

8. The vehicle lamp according to claim 7, wherein the reflecting member is made of a resin member having light diffusion properties.

9. A vehicle lamp comprising:

a light source; and a light guide body configured to guide light emitted from the light source, wherein the light guide body has:

a first light guide part disposed in front of the light source;

an incidence section that is located on a base end side of the first light guide part and that is configured to cause the light emitted from the light source to enter the first light guide part;

a diverging portion located on a tip side of the first light guide part;

a second light guide part extending from the diverging portion toward one side in a first direction;

a third light guide part extending from the diverging portion toward other side in the first direction;

a first curved portion that is a portion of the second light guide part curved from the diverging portion toward the one side in the first direction; and a second curved portion that is a portion of the third light guide part curved from the diverging portion toward the other side in the first direction, and wherein the light guide body has:

a first reflecting section that is located on a back surface side of the second light guide part and that is configured to reflect the light guided in the second light guide part toward a front surface side of the second light guide part;

a first emitting section that is located on the front surface side of the second light guide part and that is configured to emit the light reflected by the first reflecting section to an outside of the second light guide part;

a second reflecting section that is located on a back surface side of the third light guide part and that is configured to reflect the light guided in the third light guide part toward a front surface side of the third light guide part;

a second emitting section that is located on the front surface side of the third light guide part and that is configured to emit the light reflected by the second reflecting section to an outside of the third light guide part; and a reflecting member that includes a first reflecting region facing the diverging portion and a pair of second reflecting regions facing the first light emitting section and the second light emitting section, the diverging portion is formed so that at least a part of a boundary between the first curved portion and the second curved portion describes a straight line in a cross section of a second direction which is perpendicular to an axial direction of the first light guide part, and the first reflecting region has a greater degree of diffusion of light than the pair of the second reflecting regions.

10. The vehicle lamp according to claim 9, wherein a cross section of the incidence section in the second direction and the cross section of the diverging portion in the second direction are formed so as to describe ovals in which two imaginary partial circles are connected with two parallel tangential lines.

11. The vehicle lamp according to claim 9, wherein the first curved portion and the second curved portion are formed so as to gradually change from the straight line to an arc from the boundary toward each of tip sides of the first curved portion and the second curved portion in cross sections of a third direction perpendicular to axial directions of the first curved portion and the second curved portion.

12. The vehicle lamp according to claim 9, wherein the light source includes a plurality of light emitting elements that are provided on a same surface of a substrate and that are configured to emit light radially toward a same direction.

13. The vehicle lamp according to claim 12, wherein the light source is disposed in a coupler socket.

14. The vehicle lamp according to claim 9, wherein the reflecting member is made of a resin member having light diffusion properties.

* * * * *